Oct. 12, 1965

C. K. LEEPER ETAL 3,210,930

GAS GENERATOR

Filed Feb. 1, 1962

2 Sheets-Sheet 1

INVENTORS
CHARLES K. LEEPER,
JOSEPH PADGETT,
BILL TATE &
HOWARD H. NIEDERMAN

BY Martha L. Ross
AGENT

Oct. 12, 1965    C. K. LEEPER ETAL    3,210,930
GAS GENERATOR
Filed Feb. 1, 1962    2 Sheets-Sheet 2

INVENTORS
CHARLES K. LEEPER,
JOSEPH PADGETT,
BILL TATE &
HOWARD H. NIEDERMAN
BY Martha L. Ross
AGENT

United States Patent Office 3,210,930
Patented Oct. 12, 1965

3,210,930
GAS GENERATOR
Charles K. Leeper, Annandale, Joseph Padgett, Springfield, and Bill Tate, Annandale, Va., and Howard H. Niederman, Pasadena, Calif., assignors to Atlantic Research Corporation, Fairfax County, Va., a corporation of Virginia
Filed Feb. 1, 1962, Ser. No. 170,863
10 Claims. (Cl. 60—35.6)

This invention relates to an intermittently operated gas generator and in particular to a solid propellant rocket motor capable of intermittent operation.

In certain rocket motor applications, such as in the attitude control or space vectoring of space vehicles, the need has existed for a rocket motor capable of repeated firings to achieve long-term attitude control. Prior efforts in this regard have resulted in placing a rocket or rockets about the roll, pitch and yaw axes, and using a rocket motor design wherein the propellant is completely or partially consumed, depending upon the amount of thrust required to position the vehicle in its new attitude. If it was intended to consume completely the propellant in a rocket motor for each axial movement required in an attitude change, a sufficient number of solid propellant fueled rockets were provided for each axis to ensure complete maneuverability of the space craft during its tenure in space. This resulted in a considerable increase in dead weight and required the design of a reliable switching technique to obtain ignition at the proper time and in the proper order of the rockets positioned about each axis. If it was intended only partially to consume the propellant during an attitude change and utilize the same motor for subsequent vectoring, a relatively larger rocket employing liquid fuel was required. This resulted in complicated metering and valving apparatus and necessitated reliable start and stop operation.

The present invention describes a rocket motor system capable of attitude control of a space vehicle which eliminates the use of a number of rockets placed about the various axes, which is not burdened by the existing problems of start-stop operation and which needs but one ignition device for each rocket system.

Accordingly, it is an object of the invention to provide a solid propellant fueled gas generator capable of repeated operation.

A further object is to provide a solid propellant fueled rocket capable of intermittent firings.

Another object is to provide a rocket motor supplied with a series of individual propellant charges to effect a pulsing thrust output.

Figure 1:
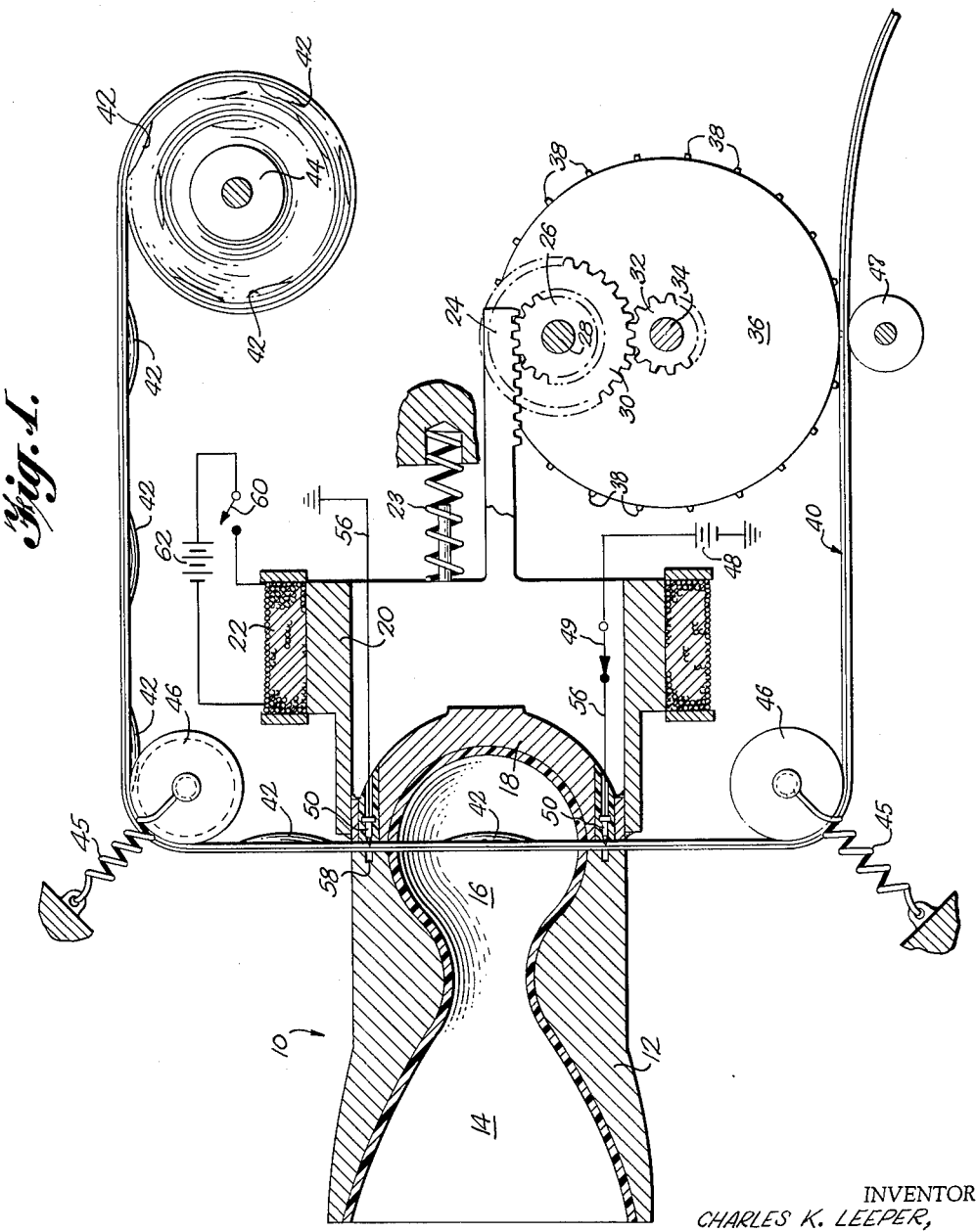
Figure 2:
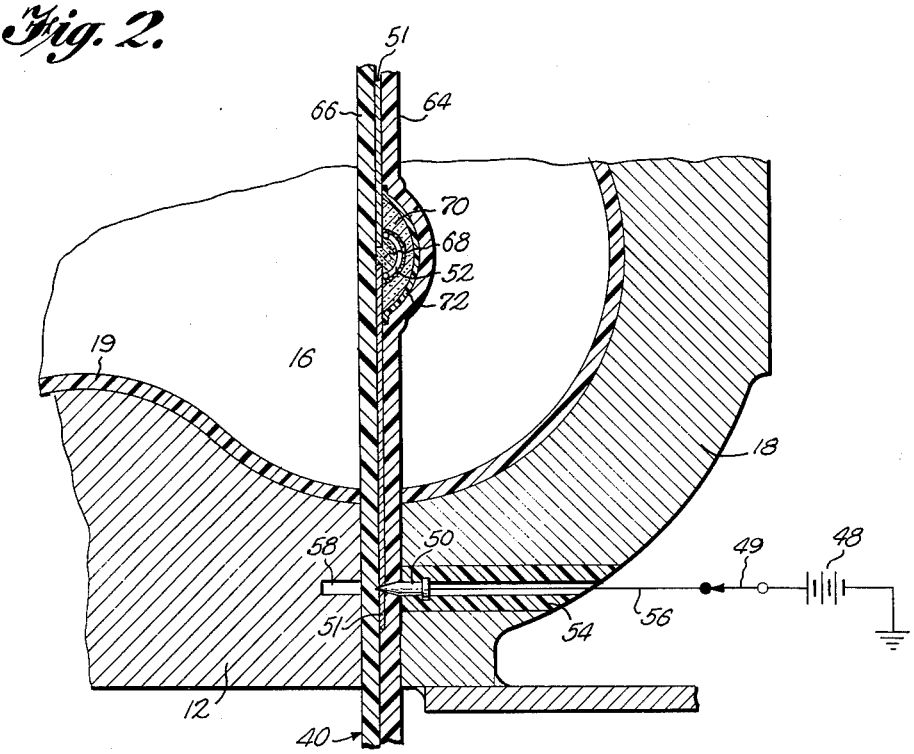
Figure 3:
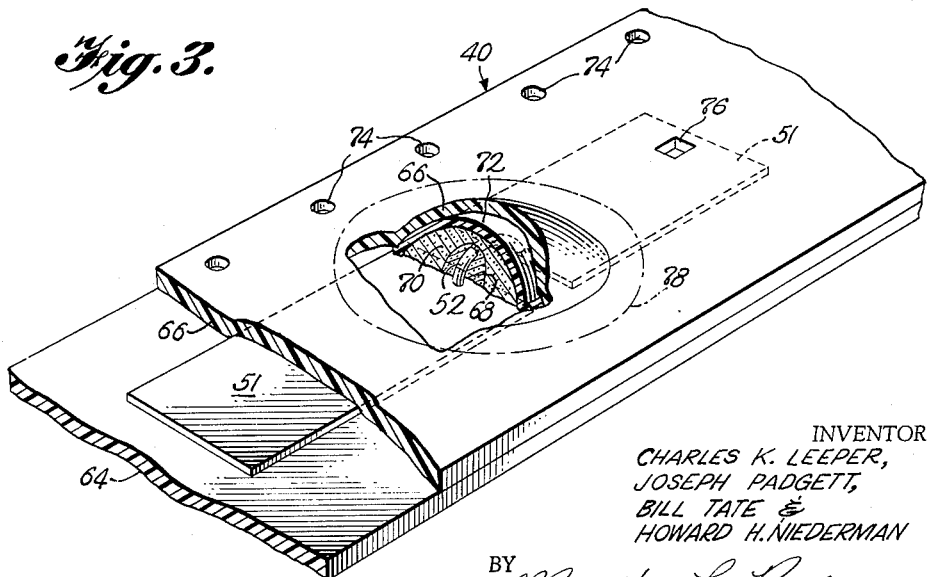

Further objects and advantages will be seen by a reading of the following specification in conjunction with the drawings wherein FIGURE 1 is a partial section of an elevation view of an embodiment of the present invention shown in schematic form. FIGURE 2 is an enlarged detailed showing of a portion of FIGURE 1. FIGURE 3 is a fragmentary perspective view of a portion of the tape and encapsulated propellant.

Broadly speaking, the invention comprises a pulserocket which can be used in an attitude control system for a space craft. The rocket comprises a motor which is separable to permit the step-feeding thereinto of a series of individual solid propellant charges. The propellant is encapsulated on a continuous tape, each capsule or cup of propellant containing its own igniter. The tape is fed by a drive means from a storage magazine along a path that carries it through the ignition or combustion chamber of the rocket motor. When an encapsulated propellant charge is positioned within the combustion chamber, the motor closes and the charge is ignited. The generated gases are expelled through an exhaust nozzle to produce thrust. The thrust produced by the serially ignited charges is pulsating in its effect and can operate for one or more pulses depending upon the total thrust demands.

FIGURE 1 discloses a schematic of an embodiment of the present invention showing a rocket motor 10 divided into two sections. The rear section 12 of the motor contains the restricted exhaust nozzle 14 and defines a portion of the combustion, or ignition chamber 16. The remainder of the combustion chamber 16 is included in the forward section or breech 18 of the rocket motor 10. The nozzle 14 and combustion chamber 16 are lined with a conventional insulator 19. If desired, the insulation 19 can be replaced by a hard, anodized coating of aluminum. Breech 18 has integrally or otherwise connected longitudinal extension 20 which forms the armature or plunger of solenoid 22 to displace longitudinally breech 18 from section 12 of motor 10 when solenoid 22 is cocked or actauted. Spring 23, bearing against the rear of armature 20, is compressed when the solenoid 22 is actuated and serves to rejoin the rocket sections in a tight fit when the solenoid is de-energized.

Attached to armature 20, and extending longitudinally therefrom, is at least one rack 24 which meshes with pinion gear 26 fixed on shaft 28. Affixed to shaft 28, and concentric with gear 26, is a larger gear 30 which meshes with gear 32 mounted on shaft 34. This shaft 34 is adapted to actuate a ratchet wheel, formed as a sprocket 36, in any conventional manner such as by a pawl (not shown) which is lifted out of engagement with internal teeth (not shown) of the ratchet wheel when reversing. By use of the rack and pinion, the various gears, and the pawl and ratchet movement, reciprocating linear motion of the solenoid plunger 20 is transformed into intermittent circular motion of the sprocket 36.

The sprocket 36 is provided externally with a series of equally spaced teeth 38 that engage equally spaced slots in tape 40 to advance the tape upon actuation of the solenoid 22. The tape 40 can consist of a double strip of a low friction substance, such as Teflon, which encapsulates or sandwiches at spaced intervals pellets 42, which consist of a propellant charge, igniter and electrical contacts as later described. The tape 40 can be conveniently wound on a magazine or drum 44 from which it is fed through the combustion chamber 16 to ratchet wheel 36. The drum 44 can be constructed to rotate with or without drag and, if necessary, can be driven in conjunction with sprocket 36 by conventional linkages. Idlers 46 and 47 are preferably low friction devices made of a material such as a fluorocarbon polymer, e.g. tetrafluoroethylene, that serve to align and guide the tape 40, and can be either fixed or rotable. Additionally, the idlers, especially idlers 46, can be spring-biased by springs 45 to provide temporary slack in the tape. This springbiasing, together with the tensile strength of the tape, reduces the possibility of tape breakage if the tape tries to advance before the breech 18 opens.

The propellant ignition is initiated electrically in this case by battery 48 through metal pins 50 which penetrate the metal igniter contacts 51 in the tape 40 as shown in the enlarged view of FIGURE 2. The electrical circuit is completed through the standard squib bridge-wire 52. The pins 50 are soldered, or otherwise joined to wire leads 56, and the leads are surrounded by insulation 54, such as a hollow cylinder of phenolic resin, e.g. Bakelite, attached to a cylindrical bore in the breech 18 of the rocket motor 10. The pins 50 are embedded in the phenolic 54 to provide a rigid seating for the pins. Facing the pins 50, and located in the forward section 12 of the rocket motor, are recesses 58, larger in diameter than the pins 50, and of a length sufficient to receive the pins 50 without contact when the motor sections are closed in the absence of tape 40. While the wires 56 are shown surrounded by the phenolic 54, they could equally as well be embedded therein, or could themselves be insulated, which would dispense with the need of the phenolic 54 except in the area of the pins 50. While the pins 50 are shown as piercing the igniter contacts 51 in the tape 40, the length of the pin could be varied to just indent or contact the contacts 51. If piercing of the tape 40 is not desired, it can be constructed with a removed portion over the point where contact is made with the igniter contacts 51, eliminating the requirement of a sharp pin.

The solenoid 22 is actuated by battery 62 when switch 60 is closed. Switch 60 can be operated manually or automatically and, if automatic in its operation, can be controlled by command signals either within the space craft or from a distant point via a radio link to operate switch 60 one or more times to achieve the desired attitude change.

In operation, switch 60 is closed to actuate solenoid 22. Armature or plunger 20 shifts longitudinally to separate breech 18 from section 12 of motor 10, thus opening combustion chamber 16. Concurrent with the shift of plunger 20, rack 24 turns pinion gear 26 and effects a counter-clockwise rotation of ratchet wheel 36. Tape 40 advances and positions a pellet 42 within the combustion chamber 16. When switch 60 is opened, plunger 20 returns to its original position, closing combustion chamber 16 and clamping the tape 40 firmly, thus sealing the combustion chamber. Upon closing, pins 50 make contact with igniter contacts 51, completing the ignition circuit through squib bridge-wire 52. The propellant in the pellet 42 is ignited and burns to generate gases, the gases being discharged through nozzle 14 to produce thrust. If desired, once the gases in combustion chamber 16 have been discharged, switch 60 can again be closed and opened to repeat the operation cycle.

As shown in FIGURE 2, switch 49 in the ignition circuit is in the closed position requiring no actuation of this switch to ignite the propellant when the breech 18 closes. If, as a safety feature to ensure that the propellant in chamber 16 is not ignited until the section 18 is fully closed, switch 49 could be delay-timed to close after switch 60 is opened and the solenoid 22 is de-energized. Mechanical actuation could be accomplished by making switch 49 a conventional microswitch, not shown, placed in the path of the plunger 20 so that it would be actuated when the plunger 20 and breech 18 return to the closed position.

In FIGURES 2 and 3 the construction of the tape 40 and the pellets 42 of encapsulated propellant is shown. The tape 40 can be composed of two strips of any suitable non-conductive material of adequate strength, preferably an organic polymer, such as a polymeric fluorocarbon, e.g. Teflon 64, 66. The igniter contacts 51 consist of two areas of a conductor such as aluminum, vapor deposited on strip 64, or can be instead aluminum foil cemented to this strip. A small gap exists between the contacts 51 across which the standard squib resistance wire known as a bridge-wire 52 is soldered. A common initiation composition, such as lead styphnate or lead azide, is painted on the bridge-wire to form a bead or spot charge 68 sufficient to ignite the main propellant charge 70. The propellant charge 70 in powder, shaped or other form will be contained in an insulating cup 72 made of any suitable material such as Mylar and can consist of additional initiation composition such as used for charge 68 or can be any suitable propellant material known in the art, such as a double-base propellant comprising nitrocellulose plasticized with nitroglycerine or a composite propellant such as a composition comprising plasticized polyvinyl chloride and ammonium perchlorate. The cup 72 containing the propellant charge 70 is bonded to the igniter contacts 51. Teflon strip 66 is heat sealed to the top of the entire structure shown to form a reasonably strong structure resembling in appearance a large roll of caps which will be wound on drum 44. FIGURE 3 also shows the slots or holes 74 by which the tape 40 is advanced by teeth 38 in sprocket 36. If desired, the tape 66 can contain removed portions such as shown by numeral 76 to permit contact of the igniter contacts by the pins without piercing tape 66.

The apparatus shown is particularly useful for rocket motors having a low total impulse, such as .01 lb./sec., although this can, of course, be varied as desired. The Teflon strips 64 and 66 associated with this small motor can, as an example, be on the order of 1½ inches wide and .02 inch thick. The gases generated in the capsules 42 after ignition of the initiator and propellant will rupture the Teflon strips. These strips, being plastic, will decompose or burn in the combustion chamber 16, as will the non-metal cup 72. The igniter contacts 51 exposed in the combustion chamber will melt under the high heat of combustion. After combustion, the tape 40 will contain a series of approximately circular holes, such as shown by dash line 78 in FIGURE 3 caused by the presence of this portion of the tape in the combustion chamber during combustion. As can be seen by this figure, the tape 40 is constructed to make certain that the tape is not completely consumed in its width, thereby ensuring no interruption of feeding. The width of the tape 40 additionally enables the combustion chamber to be effectively sealed on its separation periphery during combustion.

The ignition circuit within the tape has been described as two contacts 51 composed of vapor-deposited aluminum or aluminum foil and a bridge-wire 52 which is soldered across the gap between the contacts. If desired, this ignition circuit can be replaced by a continuous fusible metal element or a resistance wire of any suitable width sandwiched within the tape and constructed to generate sufficient heat within the propellant capsule to ignite the igniter charge.

While the invention has been described with reference to a particular embodiment, it is apparent that various modifications are possible. An example is where the breech 18 remains open until closed by a solenoid 22, and returns ot its open position after combustion is completed. Since this and other modifications can obviously be made by one skilled in the art, it is intended not to limit the principle of the invention except by the scope of the appended claims.

We claim:

1. A pulse rocket motor system comprising
   (a) a combustion chamber having an exhaust port therethrough,
   (b) a plurality of propellant charges, each of said charges being enclosed within a capsule at least a portion of which is made of electrically nonconducting material,
   (c) support means for said capsules, said support means comprising an elongated strip of electrically nonconducting material, said capsules being fixedly mounted on said strip in spaced, series relationship,
   (d) means for intermittently advancing said strip and said capsules into said combustion chamber to place said capsules sequentially in an ignition position, and
   (e) means for igniting each of said propellant charges when each of said capsules is in said ignition position, the igniting means comprising,
      (i) elongated electrical conduction means on said strip formed in circuit with said propellant charges, said conduction means extending outwardly from each of said capsules toward the next adjacent capsule, and
      (ii) electrical power supply means completing an electrical circuit with said electrical conduction means when each of said capsules is in said ignition position, whereby the gases generated upon combustion of said propellant charges exhaust through said exhaust port.

2. A pulse rocket motor system comprising
   (a) a combustion chamber having an exhaust port therethrough,
   (b) A plurality of propellant charges, each of said charges being contained within an electrically nonconductive capsule,
   (c) support means for said capsules, said support means comprising an elongated strip of electrically nonconductive material, said capsules being fixedly mounted on said strip in spaced, series relationship,
   (d) means for intermittently advancing said strip and said capsules into said combustion chamber to place said capsules sequentially in an ignition position, and
   (e) means for igniting each of said propellant charges when each of said capsules is in said ignition position, the igniting means comprising
      (i) elongated electrical conduction means on said strip formed in circuit with the interior of each of said capsules, said conduction means extending outwardly from each of said capsules toward the next adjacent capsule, and
      (ii) electrical power supply means completing an electrical current circuit with said electrical conduction means when each of said capsules is in said ignition position, whereby the gases generated upon combustion of said propellant charges exhaust through said exhaust port.

3. A pulse rocket motor system comprising,
   (a) a combustion chamber including a first and second section, said second section being movable relative to said first section, one of said sections having an exhaust port therethrough,
   (b) a plurality of propellant charges, each of said charges being enclosed within a capsule, at least a portion of said capsules being made of electrically nonconductive material,
   (c) support means for said capsules, said support means comprising an elongated strip of electrically nonconducting material, said capsules being fixedly mounted on said strip in spaced, series relationship,
   (d) means for intermittently advancing said strip and said capsules between said first and second sections to place said capsules sequentially in an ignition position,
   (e) means synchronized with the strip advancing means for moving said second section relative to said first section such that said second section is spaced from said first section when a propellant charge is being advanced into said ignition position and said second section forms a combustion chamber with said first section immediately prior to ignition of said propellant charge, and
   (f) means for igniting each of said propellant charges when each of said capsules is in said ignition position and said second section forms a combustion chamber with said first section, the igniting means comprising,
      (i) elongated electrical conduction means on said strip formed in circuit with said propellant charge, said conduction means extending outwardly from each of said capsules toward the next adjacent capsule and
      (ii) electrical power supply means completing an electrical circuit with said electrical conduction means when each of said capsules is in said ignition position, whereby the gases generated upon combustion of said propellant charges exhaust through said exhaust port.

4. A pulse rocket motor system comprising,
   (a) a combustion chamber having an exhaust port therethrough,
   (b) a plurality of propellant charges, each of said charges being enclosed within a capsule at least a portion of which is made of electrically nonconducting material,
   (c) support means for said capsules, said support means comprising an elongated strip of electrically nonconducting material, said capsules being fixedly mounted on said strip in spaced, series relationship,
   (d) means for intermittently advancing said strip and said capsules into said combustion chamber to place said capsules sequentially in an ignition position, and
   (e) means for igniting each of said propellant charges when each of said capsules is in said ignition position, the igniting means comprising,
      (i) a pair of elongated electrical conductors on said strip in electrical circuit connection with each of said propellant charges, one end of each of said conductors extending within each of said capsules, said conductors extending outwardly from each of said capsules toward the next adjacent capsule,
      (ii) a bridge wire in contact with each of said propellant charges and electrically interconnecting the conductors of each said pair, respectively, and
      (iii) electrical power supply means completing an electrical circuit with each pair of electrical conductors and said bridge wire when each of said capsules is in said ignition position.

5. A pulse rocket motor system comprising,
   (a) a combustion chamber including a first and second section, said second section being movable relative to said first section, one of said sections having an exhaust port therethrough,
   (b) a plurality of propellant charges each of said charges being enclosed within a capsule, at least a portion of said capsule being made of electrically nonconductive material,
   (c) support means for said capsules, said support means comprising an elongated strip of electrically nonconducting material, said capsules being fixedly mounted on said strip in spaced, series relationship,
   (d) means for intermittently advancing said strip and said capsules between said first and second sections to place said capsules sequentially in an ignition position,
   (e) means synchronized with the strip advancing means for moving said second section relative to said first section such that said second section is spaced from said first section when a propellant charge is being advanced into said ignition position and said second section forms a combustion chamber with said first section immediately prior to ignition of said propellant charge, and
   (f) means for igniting each of said propellant charges when each of said capsules is in said ignition position, the igniting means comprising,
      (i) a pair of electrical conductors on said strip in electrical circuit connection with each of said propellant charges, one end of each of said conductors extending within each of said capsules, said conductors extending outwardly from each of said capsules toward the next adjacent capsule,
      (ii) a bridge wire in contact with each of said propellant charges and electrically interconnecting the conductors of each said pair, respectively, and
      (iii) electrical power supply means completing an electrical circuit with each pair of electrical conductors and said bridge wire when each of said capsules is in said ignition position.

6. A pulse rocket motor system as defined in claim 5 wherein said electrical power supply means includes a pair of electrically conductive elements mounted on said second section.

7. A pulse rocket motor system comprising
(a) a combustion chamber having an exhaust port therethrough,
(b) a plurality of propellant charges, each of said charges being enclosed within a capsule at least a portion of said capsule being made of electrically nonconductive material,
(c) support means for said capsules, said support means comprising a first elongated strip of electrically nonconductive material, said capsules being mounted on said strip in spaced series relationship and a second elongated strip of electrically nonconductive material bonded to said first strip and enclosing said capsules between said first and said second strips,
(d) means for intermittently advancing said support means and said capsules into said combustion chamber to place, sequentially, said capsules in an ignition position,
(e) means for igniting each of said propellant charges when each of said propellant charges is in said ignition position, the igniting means comprising
(i) electrical conduction means mounted on said support means formed in circuit with said propellant charges, and
(ii) electrical power supply means completing an electrical circuit with said electrical conduction means when each of said propellant charges is in said ignition position.

whereby the gases generated upon combustion of said propellant charge exhaust through said exhaust port.

8. A pulse rocket motor system as defined in claim 7 wherein said electrical conduction means comprises a pair of electrical conductors in electrical circuit connection with each of said propellant charges, said electrical conductors being secured between said first and said second strips.

9. A pulse rocket motor system as defined in claim 8 wherein an aperture extends through said second strip immediately adjacent each of said conductors exposing said conductors and wherein said power supply means includes a power source and a pair of electrically conductive probes, said probes extending through the apertures and contacting the conductors completing an electrical circuit with the propellant charge located in said ignition position whereby an electric current passing through said probes and through said conductors effects ignition of said propellant.

10. A pulse rocket motor system as defined in claim 9 wherein said combustion chamber comprises a first and a second section, said second section being movable relative to said first section and wherein said probes are mounted on said second section.

References Cited by the Examiner

UNITED STATES PATENTS

| | | | |
|---|---|---|---|
| 691,500 | 1/02 | Stenersen | 60—39.47 X |
| 1,191,299 | 7/16 | Goddard | 102—34.5 |
| 1,311,885 | 8/19 | Goddard | 102—34.5 |
| 1,824,457 | 9/31 | Barlow. | |
| 2,396,566 | 3/46 | Goddard | 102—34.5 |
| 2,403,730 | 7/46 | MacNeille | 60—26.11 X |

FOREIGN PATENTS

| | | |
|---|---|---|
| 969,930 | 5/50 | France. |
| 10,011 | 5/11 | Great Britain. |

MARK NEWMAN, *Primary Examiner.*

SAMUEL FEINBERG, SAMUEL LEVINE, *Examiners.*